United States Patent
Sherman et al.

(10) Patent No.: US 7,953,409 B2
(45) Date of Patent: May 31, 2011

(54) ALTERNATIVE WIRELESS TELEPHONE ROAMING USING PREPAID SERVICES

(75) Inventors: Stephen Sherman, Alpharetta, GA (US); Corey Feldstein, Powder Springs, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 603 days.

(21) Appl. No.: 11/959,909

(22) Filed: Dec. 19, 2007

(65) Prior Publication Data

US 2008/0188218 A1 Aug. 7, 2008

Related U.S. Application Data

(63) Continuation of application No. 10/923,425, filed on Aug. 20, 2004, now Pat. No. 7,324,816, which is a continuation of application No. 09/992,626, filed on Nov. 6, 2001, now Pat. No. 6,792,271.

(51) Int. Cl.
*H04Q 7/20* (2006.01)

(52) U.S. Cl. ............... 455/432.1; 455/435.1; 455/435.2; 379/114.2

(58) Field of Classification Search ............... 455/432.1, 455/435.1, 435.2, 406, 407, 432.2; 379/114.2, 379/114.15
See application file for complete search history.

(56) References Cited

U.S. PATENT DOCUMENTS

| | | | |
|---|---|---|---|
| 5,778,313 A | 7/1998 | Fougnies | |
| 5,915,226 A | 6/1999 | Martineau | |
| 6,070,067 A | 5/2000 | Nguyen et al. | |
| 6,185,414 B1 | 2/2001 | Brunner et al. | |
| 6,226,364 B1 * | 5/2001 | O'Neil | 379/114.2 |
| 6,236,857 B1 | 5/2001 | Calabrese et al. | |
| 6,603,968 B2 | 8/2003 | Anvekar et al. | |
| 6,684,072 B1 * | 1/2004 | Anvekar et al. | 455/432.1 |
| 6,975,852 B1 | 12/2005 | Sofer et al. | |
| 2002/0052754 A1 | 5/2002 | Joyce et al. | |
| 2002/0197991 A1 * | 12/2002 | Anvekar et al. | 455/432 |

OTHER PUBLICATIONS

Office Action issued by the USPTO having U.S. Appl. No. 09/992,626 on Nov. 12, 2003.

* cited by examiner

*Primary Examiner* — CongVan Tran (57) ABSTRACT

A method and system are provided for registering and operating a wireless telephone in a roaming service area in which the wireless telephone is not registered for roaming services. When a wireless telephone is operated in a such a roaming service area, the roaming service provider whose services the wireless telephone must utilize in order to operate in the roaming service area informs the user of the wireless telephone through a recorded or live message that the wireless telephone may be used in the roaming service area if the user of the wireless telephone purchases and uses a prepaid utilization account offered by the roaming service provider. If the user purchases a prepaid card and loads a balance into a prepaid utilization account, a prepaid services system of the roaming service provider establishes a pseudo-telephone number for use by the wireless telephone in the roaming service area. The user's home service provider is notified that all calls directed to the user's permanent wireless telephone number should be forwarded to the pseudo-number assigned to the wireless telephone. After this registration process is completed, calls may be placed to and from the wireless telephone in the roaming service area, and billing for those calls will be directed to the prepaid utilization account purchased by the user.

23 Claims, 4 Drawing Sheets

ALTERNATIVE WIRELESS TELEPHONE ROAMING USING PREPAID SERVICES

CROSS-REFERENCE TO RELATED APPLICATIONS

This application is a continuation of co-pending U.S. patent application Ser. No. 10/923,425, filed Aug. 20, 2004, which is in turn a continuation of U.S. patent application Ser. No. 09/992,626, filed Nov. 6, 2001 now U.S. Pat. No. 6,792,271, which is hereby incorporated by reference in its entirety.

FIELD OF THE INVENTION

This invention relates to a system and method for utilizing prepaid services in a wireless telephone network for allowing use of a wireless telephone in an area in which the wireless telephone is not registered for roaming services.

BACKGROUND OF THE INVENTION

In a typical wireless telecommunications system, users of wireless telephones subscribe to the services of a given wireless services provider for use of their wireless telephone in prescribed service areas. When the wireless telephone is operated outside the prescribed service area, the telephone enters into a roaming mode whereby it must use the wireless services of a services provider other than its home service provider. Typically, wireless service providers enter into agreements with other wireless service providers to allow their customers to use the services of other service providers when their customers are roaming in service areas outside their home service area. As a part of such agreements, information required to verify the legitimacy of the wireless telephone and information required for call processing for that wireless telephone is passed from the home service provider for the wireless telephone to other service providers with which the home service provider has roaming service agreements. Information supplied to potential roaming service providers includes the wireless telephone directory number and the mobile identification number for the wireless telephone.

Accordingly, when the user of the wireless telephone roams from her home service area to a roaming service area and attempts to send or receive calls, a wireless switch in the roaming service area will detect the call, verify that the wireless telephone may use the services of the roaming service provider in accordance with the services agreement between the telephone's home service provider and the roaming service provider, and the wireless telephone call will be processed. In order to facilitate call processing, a home location register (HLR) of the roaming service provider contacts the home location register of the home service provider for any additional information needed for call processing including information required for billing associated with the call. Billing records associated with a call are typically generated at the switch or billing system of the roaming service provider and are subsequently forwarded back to the home service provider of the wireless telephone. The wireless provider compensates the roaming service provider for its services and bills the user of the wireless telephone for usage in the roaming service area.

A problem exists, however, when the user of the wireless telephone attempts to use the wireless telephone in a roaming service area in which the user's home service provider has no roaming service agreements in place with service providers in the roaming service area. This problem is particularly prevalent when wireless customers travel to foreign countries where there are few if any reciprocal service agreements between local wireless service providers and wireless service providers of the user's home country. When the user of the wireless telephone attempts to use the telephone in such an area, the wireless telephone will be registered on a local wireless switch in the roaming service area as an invalid subscriber because information necessary to identify the wireless telephone and process the call will not have been stored on that switch due to the absence of a roaming service agreement. Accordingly, the user will not be able to send and receive calls in that roaming service area.

Therefore, there is a need in the art for a method and system for allowing a wireless telephone to temporarily register and operate in a roaming wireless service area in which the wireless telephone is not otherwise registered to operate.

SUMMARY OF THE INVENTION

In accordance with the present invention, the above and other problems are solved by a method and system for registering and operating a wireless telephone in a roaming service area in which the wireless telephone is not registered for roaming services. When a wireless telephone is operated in a such a roaming service area, the roaming service provider whose services the wireless telephone must utilize in order to operate in the roaming service area informs the user of the wireless telephone through a recorded or live message that the wireless telephone may be used in the roaming service area if the user of the wireless telephone purchases and uses a prepaid utilization account offered by the roaming service provider. If the user purchases a prepaid card and loads it into the utilization account, a prepaid services system of the roaming service provider establishes a pseudo-telephone number for use by the wireless telephone in the roaming service area. The user's home service provider is notified that all calls directed to the user's permanent wireless telephone number should be forwarded to the pseudo-number assigned to the wireless telephone. After this registration process is completed, calls may be placed to and from the wireless telephone in the roaming service area, and billing for those calls will be directed to the prepaid utilization account purchased by the user.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE PREFERRED EMBODIMENT

The following description of an exemplary embodiment of the present invention is made with reference to the above-described drawings wherein like numerals refer to like parts or components throughout the several figures. The present invention is directed toward a method and system for registering and operating a wireless telephone in a roaming service area in which the wireless telephone is not registered to operate, for example, when wireless service provider of the wireless telephone does not have agreements in place to allow use of the wireless telephone in the roaming service area.

Figure 1:
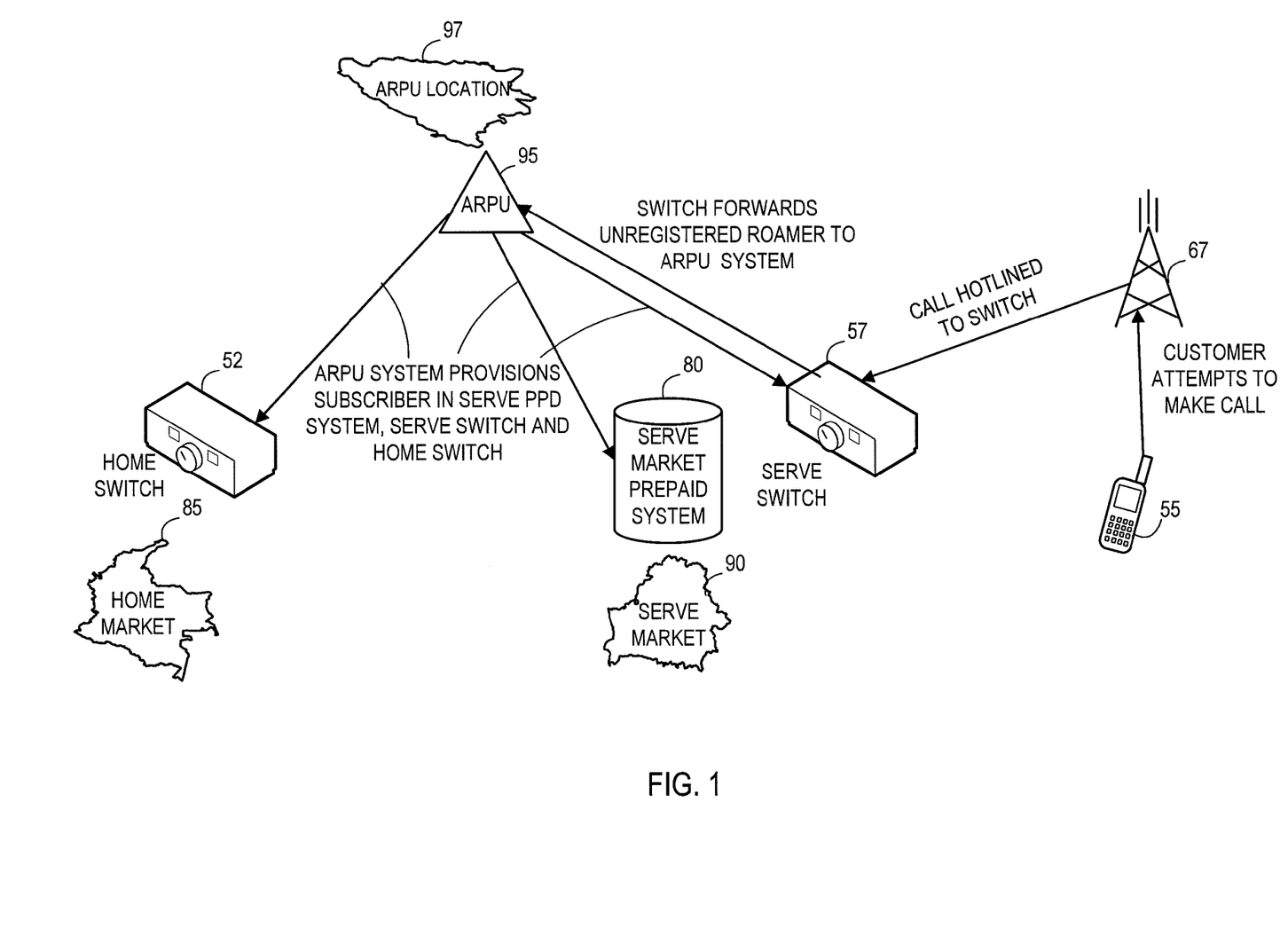
FIG. 1 is a pictorial diagram representing the system architecture of an exemplary embodiment of the present invention.

Referring to FIG. 1, when a wireless telephone 55 is operated in a roaming service area in which the wireless telephone is not registered to operate, a wireless call attempt is transmitted through an antenna system 67 to a wireless service switch 57 where it is determined that the wireless telephone is not registered for service in the roaming service area. According to an exemplary embodiment of the present invention, the wireless service switch 57 signals an alternative roaming via prepaid utilization (ARPU) system 95 operated by the roaming service provider whose services the wireless telephone 55 must utilize in order to operate in the roaming service area. In response, the ARPU 95 informs the user of the wireless telephone 55 through a recorded or live message that the wireless telephone 55 may be used in the roaming service market 90 if the user of the wireless telephone 55 purchases a prepaid card and loads it into a utilization account.

If the user of the wireless telephone 55 purchases a prepaid card and loads it into a prepaid utilization account, the ARPU system 95 directs the prepaid services system 80 of the roaming service provider to establish a pseudo-telephone number for use by the wireless telephone 55 in the roaming service area 90. The ARPU system 95 then notifies the home service provider of the user's home service market 85 that all calls directed to the user's actual wireless telephone directory number should be forwarded to the wireless telephone 55 at the pseudo-number assigned to the wireless telephone 55. After this registration process is completed, calls may be placed to and from the wireless telephone 55 in the roaming service area 90, and billing for those calls will be directed to the prepaid utilization account assigned to the user. Preferred implementation of the foregoing system and method are described in detail below with reference to FIGS. 2, 3 and 4.

Exemplary Operating Environment

Figure 2:
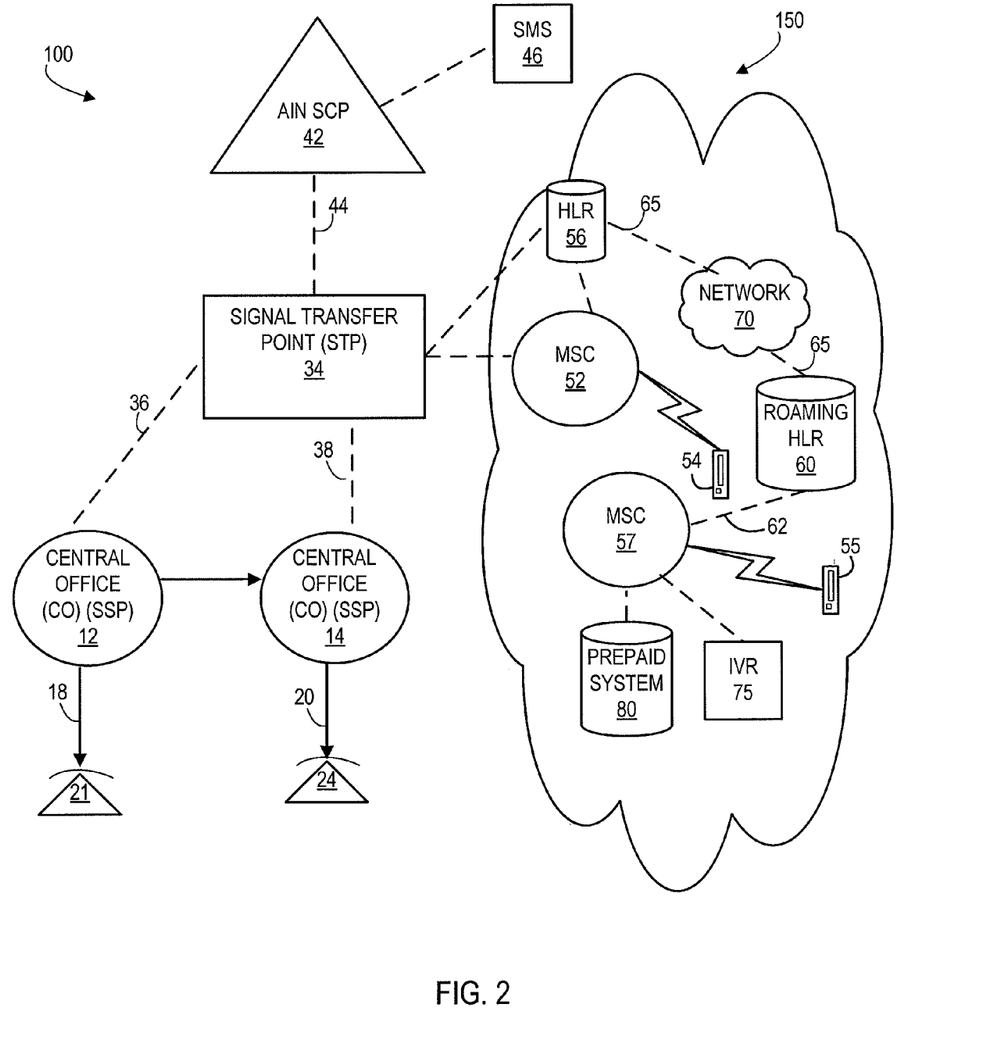
FIG. 2 is a block diagram of a telecommunications network illustrating an exemplary embodiment of the present invention.

It is advantageous to describe an exemplary operating environment in which the current invention may reside. FIG. 2 is a block diagram illustrating components of a telephone network that provides an exemplary operating environment for the present invention. Referring now to the drawings, in which like numerals represent like elements throughout the several figures, aspects of the present invention and the advanced intelligent network (AIN) and an integrated wireless network will be described.

The modern public switched telephone network (PSTN) has separate signaling paths for voice signals (or other customer-utilized communication circuits) and for control signals, which include information transmitted throughout the network to control the connection and disconnection of the voice circuits. The public switched telephone network that evolved in the 1980s incorporated the advanced intelligent network (AIN). Some of the components of the advanced intelligent network are illustrated in FIG. 2. FIG. 2 is a block diagram representing at least a part of the advanced intelligent network (AIN) 100 of a typical local exchange carrier integrated with components of a wireless network 150. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 2, each central office may include an electronic switch known to those skilled in the art as a service switching point (SSP). These are indicated in FIG. 2 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 2, central offices switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 2.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN 10 are provided by regional STPs (not shown), regional SCPs (not shown), and a service management system (SMS) 46. The STP 34 is connected to the SSPs via connections 36, 38 and 40. Both the regional SCPs and the local SCP 42, which represent a plurality of local SCPs distributed throughout the AIN 10, are connected via respective data links to the SMS 46. The SMS 46 provides a centralized platform for remotely programming the various SCPs of the AIN 10 so that a coordinated information processing scheme may be implemented for the AIN 10. The SMS 46 is implemented by a large general purpose computer and interfaces to business offices of the local exchange carrier and interexchange carriers. SSPs download, on a non-real time basis, billing information to a billing system 50 that is needed in order to appropriately invoice subscribers for the services provided.

The SCP 42 is also connected to a caller name (CNAM) database 48. The CNAM database comprises a plurality of directory numbers along with associated names for the directory numbers. The CNAM database may be used to provide a look-up database to provide caller ID service. The CNAM database may comprises directory numbers from wireline customers as well as wireless customers of wireless network 150.

In operation, the intelligent network elements of the AIN 100, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12 and 14, a relatively small set of triggers are defined at the SSP central office switches for each call.

The message created by an SSP in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well-known to those skilled in the art and will not be further described herein. For more information regarding the AIN protocol, see Bellcore Specification GR-1298-CORE Switching Systems Generic Requirements for AIN 0.1, which is incorporated herein by reference.

The wireless network 150, such as a cellular network, comprises a mobile switching center (MSC) 52. The MSC 52 is a switch providing services and coordination between wireless user in network 150 and external networks. The MSC 52 may be connected to STP 34 to provide information to the wireline network and receive information from the wireline network. The MSC 52 also communicates with a wireless subscriber, such as wireless telephones 54 and 55. For preparation of billing, the MSCs create call detail records (CDR) similar to the above-described AIN SSPs. The call detail records created by the MSCs are transmitted to the billing system 50 for preparation of periodic wireless subscriber billing.

The signaling protocol used between the components of the wireless network 150 is well known to those skilled in the art. An exemplary signaling protocol is the interim standard 41 (IS-41). The IS-41 standard defines the processed by which wireless provider accomplish signaling between the MSCs and other devices for purposes of intersystem handoff and automatic roaming. For purposes of caller identification information, as described with reference to an exemplary embodiment of the present invention, the IS-41D standard is utilized to address various features such as calling name ID, enhanced 911, and law enforcement intercept. Operation of the IS-41 signaling protocols is well known to those skilled in the art.

The MSC 52 may also be connected to a home location register (HLR) 56. The home location register 56 is a wireless telecommunications component. The HLR 56 is a permanent SS7 database used in cellular networks including the advanced mobile phone system, the global system for mobile communications and the PCS or personal communications system. The HLR 56 may be located as a separate component as illustrated in FIG. 2, or the HLR 56 may be resident on the SCP 42 of the cellular provider of record. The HLR 56 may be used to identify and verify a subscriber, including caller identification information such as name and wireless telephone number of the subscriber. The HLR 56 also contains subscriber data related to features and services subscribed to. The HLR 56 is used not only when a call is being made within an area of coverage supported by a given wireless provider, it may also be used to verify the legitimacy and features subscribed to by a given use when the user is roaming outside that area. Under roaming conditions, a local service provider may query the HLR 56 of another wireless telecommunications service provider via an SS7 data link. Once information on the subscriber is verified. Data on the subscriber may be transferred via the SS7 line to the HLR 56 of the local service provider in which the subscriber is roaming.

As illustrated in FIG. 2, a roaming HLR 60 is shown connected to a wireless switch 57 and wireless telephone 55. The wireless switch 57 is functionally connected to a prepaid services system 80 and an interactive voice response unit 75. The roaming HLR 60 and associated telecommunications components is illustrative of wireless telecommunications components of a wireless service provider located in a roaming area relative to a user's home service provider. The HLR 56 and related components such as the MSC 52 and wireless telephone 54 are illustrative of wireless telecommunications components of the wireless telephone user's home service provider. As shown in FIG. 2, the roaming HLR 60 and related components may communicate with the HLR 56 of the user's home service provider via a conventional telecommunications network 70 over data links 65.

The interactive voice response (IVR) 75 is a well known component for allowing the retrieval and processing of information by telephone. The IVR 75 may be used to retrieve information needed for call processing or implementation of call features through receipt of information via a telephone keypad or via human voice interaction. For example, the IVR 75 may be utilized to present a number of options to a user of telecommunications services followed by a receipt and storage of responses from the user. For example, the user may be asked to press or say "1" if the user desires option "1," or press or say "2" if the user desires option "2".

The prepaid services system 80 may be comprised of a combination of computer hardware and software for controlling prepaid telecommunications services. The prepaid services system 80 may be resident at a switch such as the MSC 57, or the prepaid services system 80 may be operated at an SCP 42 or as a stand-alone system. In a typical prepaid services system, a user of telecommunications services purchases a set amount of prepaid services such as sixty minutes of telephone time. When a user of the prepaid services places a call to be charged to the prepaid account, the switch processing the user's telephone call signals the prepaid services system 80 for instructions. If the user's prepaid account contains sufficient prepaid balance to complete the call, the prepaid services system 80 signals the switch to complete the call as directed by the user. The prepaid services system 80 also serves as a stand-alone billing system in that it tracks in real time the user's exhaustion of his/her prepaid account. Once the prepaid account is fully exhausted, the user is invited to purchase additional services, or call processing is terminated.

Operation of an Exemplary Embodiment

Having described an exemplary operating environment and the system architecture of the present invention with reference to FIGS. 1 and 2, FIGS. 3 and 4 are flow diagrams illustrating a method for temporarily registering and using a wireless telephone in a roaming service area utilizing prepaid services. A method 300 is described with reference to FIGS. 1-4, and for purposes of the exemplary call flow, assume that a user of a wireless telephone attempts to send and receive telephone calls in a roaming service area in which the user's wireless telephone is not registered for roaming services.

Figure 3:
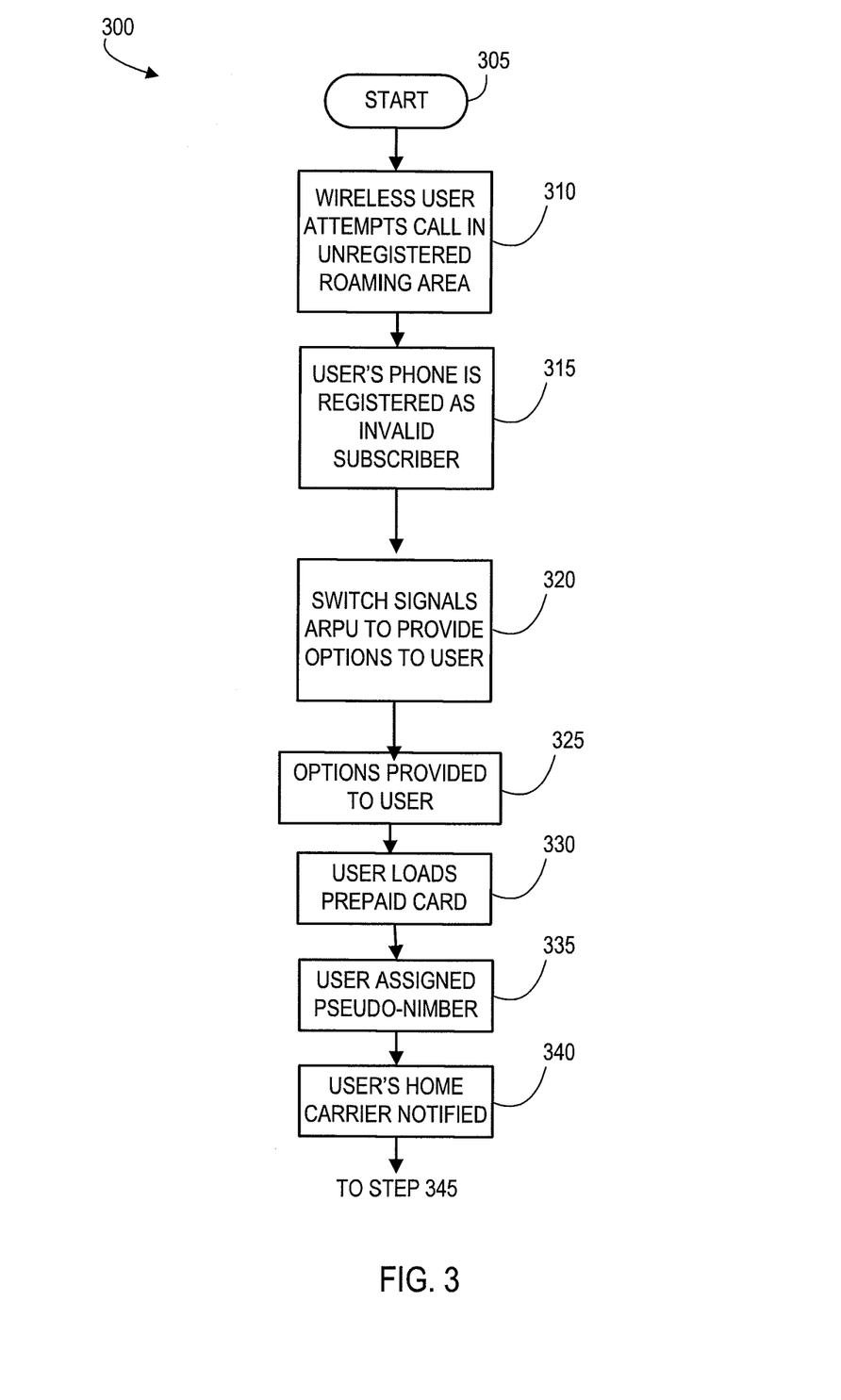
FIGS. 3 and 4 are flow diagrams illustrating a method for temporarily registering and using a wireless telephone in a roaming service area utilizing prepaid services.

The method 300 begins at step 305 and proceeds to step 310 where a user attempts to place a call via his wireless telephone 22 in a roaming service area in which the wireless telephone is not registered for roaming services. For example, the wireless telephone may be located in a foreign country in which the user's home service provider does not have roaming service agreements in place. At step 315, the call attempt from the wireless telephone 55 is received at the wireless switch 57 for call processing. At the wireless switch 57, a databas & look up is performed to locate roaming service information related to the wireless telephone 55. If necessary, the wireless switch 57 may signal the roaming HLR 60 for additional information to determine whether the wireless telephone 55 is registered for service within the roaming service area in which the wireless telephone 55 is located. Because the wireless telephone 55 is not registered for service, the roaming HLR 60 and/or the wireless switch 57 determine that the wireless telephone 55 is an invalid subscriber for services in the roaming service area.

At step 320, the wireless switch 57 signals the alternative roaming via prepaid utilization system (ARPU) 95 of the wireless service provider through which the wireless telephone 55 is attempting to operate, and the ARPU 95 directs the IVR 75 to provide the user of the wireless telephone 55 with a number of options to assist the user in utilization of the wireless telephone 55. The ARPU 95 is a combination of hardware and software operated by the roaming service provider for providing use of the roaming service provider's wireless telecommunications services while the user is in the roaming service area. The ARPU 95 may be resident in any suitable component of the roaming service provider's telecommunications system, including the HLR 60, the MSC 57, the prepaid services system 80, or at an SCP, such as the SCP 42, illustrated in FIG. 2.

At step 325, in response to instructions from the ARPU 95, the IVR 75 provides a number of options to the user of the wireless telephone 55 through the wireless switch 57. For example, the IVR 75 may play a recorded announcement to the user of the wireless telephone 55 such as "Welcome to the roaming service provider network. Your home service provider is not connected with this network. If you would like to use your wireless telephone in this area, you may load a prepaid services card or you may purchase wireless telephone time using a credit card." The announcement may then provide the user with a set of options, for example, "Press '1' to find a distribution center to purchase a prepaid services card, press '2' if you have a card and would like to load it at this time, or press '3' if you would like to speak with a service representative." Such voice announcements are exemplary only and may vary with the scope of services offered to the user by the roaming service provider.

At step 330, the user having purchased a prepaid services card loads the prepaid services card information into the prepaid system using the wireless telephone 55 in response to prompts provided by the IVR 75. As should be understood by those skilled in the art, other methods of payment for the wireless telephone services may include credit cards, promotional credit vouchers and other normally accepted forms of payment. At step 335, the IVR 75 forwards receipt of the prepaid services card or other payment method to the ARPU 95 and assigns a pseudo-telephone number to the wireless telephone 55 and registers the wireless telephone 55 at the HLR 60 and prepaid services system 80. The wireless telephone 55 is now registered as a valid subscriber of the wireless services of the roaming services provider as a function of the prepaid services purchased by the user and administered by the prepaid services system 80.

At step 340, the ARPU 95 through the roaming HLR 60 notifies the HLR 56 of the wireless telephone's 55 home service provider. Notification of the home service provider of the wireless telephone 55 includes instructions to the home service provider that all calls directed to the permanent telephone number of the wireless telephone 55 should be forwarded directly to the pseudo-number assigned to the wireless telephone 55 for operation in the roaming service area 90.

Figure 4:
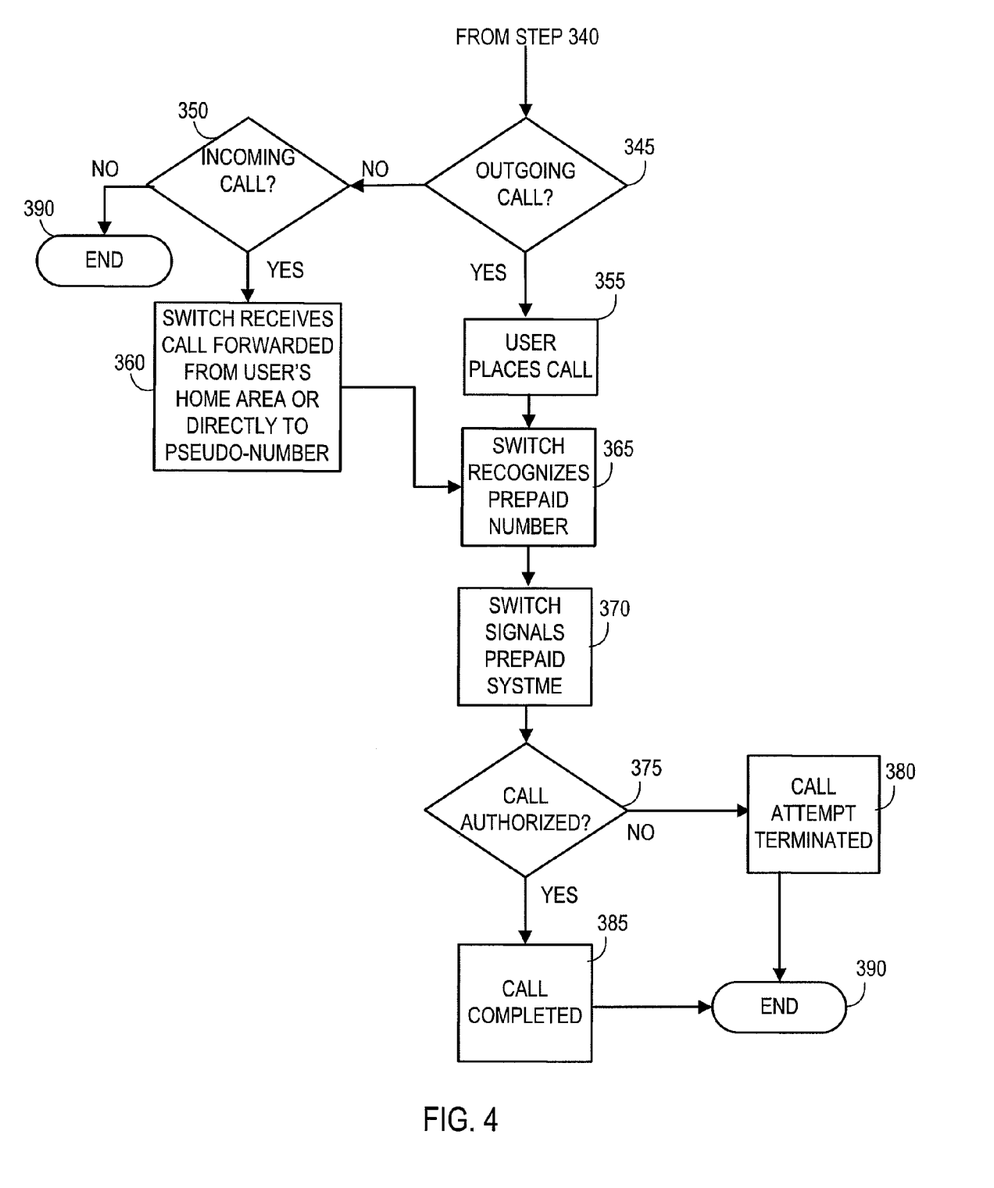

Referring now to FIG. 4, after the wireless telephone 55 is registered in the roaming service area, the user is ready to send and receive wireless telephone calls. At step 345, a determination is made as to whether the user has any outgoing calls to be placed. If yes, the method proceeds to step 355 and the user places a call using the wireless telephone 55. At step 365, the wireless switch 57 receives the call attempt signal from the wireless telephone 55 and verifies with the roaming HLR 60 that the wireless telephone 55 is registered to place telephone calls in the roaming service area. Based on the pseudo-number assigned to the wireless telephone 55 and other identifying information provided by the wireless telephone 55 during the registration process, the switch recognizes the wireless telephone 55 as a subscriber to the prepaid roaming service.

At step 370, the switch 57 signals the prepaid services system 80 for call processing. At step 375, a determination is made as to whether the wireless telephone 55 has sufficient prepaid services to complete the call placed by the user. If insufficient prepaid services remain in the user's prepaid account, for example, the user has used all prepaid wireless telephone minutes, the method proceeds to step 380 and the call attempt is terminated. If at step 375 the determination is made by the prepaid services system 80 that the user's account has sufficient prepaid services to complete the call, the method proceeds to step 385, and the call is completed based on the telephone digits dialed by the user. The method ends at step 390.

According to an exemplary embodiment, the prepaid services system 80 monitors the user's prepaid services on a real-time basis. That is, if the user has five minutes of prepaid wireless telephone time remaining when the call is completed at step 385, the call will be terminated at the exhaustion of the five minutes of remaining time. Alternatively, the user may be offered the opportunity to purchase additional prepaid service time before the call is terminated.

Returning back to step 340, if a determination is made that the user has no outgoing calls, the method proceeds to step 350, and a determination is made as to whether the user has any incoming calls directed to the wireless telephone 55. If not, the method proceeds to step 390 and ends. If yes, the method proceeds to step 360 and the wireless switch 57 receives a call forwarded from the user's home service area, as described above. Alternatively, the user may receive calls dialed directly to the pseudo-number if the user has notified callers of the availability of that number. Upon receiving a call, the method proceeds to step 365, and call processing proceeds as described above.

When the user of the wireless telephone 55 leaves the roaming service area and returns to the user's home service area, or when the user travels to a roaming service area in which he has prearranged roaming services, the HLR 56 of the home service area or roaming service area will detect the user's wireless telephone 55 when that telephone is powered on or when a call attempt is made. When the HLR 56 recognizes the wireless telephone 55 as a telephone that is registered for services in that service area, the HLR 56 will delete the instruction to forward incoming calls to the pseudo-number provided to the wireless telephone 55 in the roaming service area 90. Likewise, if the user returns to an area in which the wireless telephone 55 is not registered for service, the above-described process may be repeated to obtain wireless telephone services on a prepaid basis.

As described, a system and method are provided for enabling roaming services for wireless telephones in roaming service areas in which the wireless telephones are not registered for service. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A non-transitory computer readable medium having stored thereon computer-executable instructions that, in response to execution by a computing device, cause the computing device to perform a method of enabling use of a wireless telephone in a roaming service area using prepaid services, the method comprising:
    calling from the wireless telephone in the roaming service area;
    receiving a notification that the wireless telephone is not registered for use in the roaming service area;
    sending account information for prepaid roaming services from the wireless telephone; and
    receiving a pseudo-telephone number that enables the wireless telephone to receive calls in the roaming service area.

2. The computer readable medium of claim 1, wherein the sending the account information for the prepaid roaming services from the wireless telephone includes sending prepaid wireless air time from a prepaid calling card input to the wireless telephone.

3. The computer readable medium of claim 1, wherein the sending the account information for the prepaid roaming services from the wireless telephone includes sending prepaid account balance from a prepaid calling card input to the wireless telephone.

4. The computer readable medium of claim 1, the method further comprising registering identification information for the wireless telephone with a home location register.

5. The computer readable medium of claim 1, the method further comprising registering identification information for the wireless telephone with a prepaid services system.

6. The computer readable medium of claim 1, the method further comprising notifying a home wireless service provider for the wireless telephone of the registration of the wireless telephone for wireless services within the roaming service area.

7. The computer readable medium of claim 1, the method further comprising receiving prepaid roaming services options at the wireless telephone prior to the sending the account information for the prepaid roaming services from the wireless telephone.

8. The computer readable medium of claim 7, wherein the receiving prepaid roaming services options includes receiving instructions for inputting the account information for the prepaid roaming services into the wireless telephone.

9. The computer readable medium of claim 7, wherein the receiving prepaid roaming services options at the wireless telephone includes a notification that the wireless telephone may be used in the roaming service area when a prepaid utilization account is purchased.

10. The computer readable medium of claim 9, wherein the notification that the wireless telephone may be used in the roaming service area comprises a recorded message.

11. A method of enabling use of a wireless telephone in a roaming service area using prepaid roaming services, comprising:
    calling from the wireless telephone while in the roaming service area where the wireless telephone is not registered for use;
    receiving notification that the wireless telephone is not registered for use of wireless services in the roaming service area, and that a call will not be completed;
    sending the prepaid roaming services account information;
    receiving a pseudo-telephone number for use while registered for wireless services within the roaming service area; and
    receiving a confirmation that the wireless telephone is registered for the use of the wireless services within the roaming service area, and completing the call.

12. The method of claim 11, further comprising notifying a home wireless service provider of the wireless telephone when the wireless telephone is registered for the use of wireless services within the roaming service area, the notification including instructing the home wireless service provider for the wireless telephone to forward all calls directed to a permanent telephone number of the wireless telephone directly to the pseudo-telephone number assigned to the wireless telephone.

13. The method of claim 12, further comprising placing a call using the pseudo-telephone number while within the roaming service area.

14. The method of claim 11, wherein the sending the prepaid roaming services account information further comprises sending prepaid wireless air time from a prepaid calling card input to the wireless telephone.

15. The method of claim 11, wherein the sending the prepaid roaming services account information further comprises sending prepaid account balance from a prepaid calling card to the wireless telephone.

16. A wireless telephone, comprising:
    at least one processor;
    at least one non-propagating computer readable memory, communicatively connected to the at least one processor, and having stored thereon computer-executable instructions that, in response to execution by the processor, cause the wireless telephone to perform a method of enabling use of a wireless telephone in a roaming service area using prepaid roaming services, the method comprising:
- calling from the wireless telephone in the roaming service area;
- receiving a notification that the wireless telephone is not registered to use wireless services in the roaming service area, and that a call will not be completed;
- sending account information for the prepaid roaming services from the wireless telephone; and
- receiving a notification that the wireless telephone is registered to use wireless services in the roaming service area, and that the call is being completed.

17. The wireless telephone of claim 16, wherein the method further comprises receiving a pseudo-telephone number after sending account information for the prepaid roaming services from the wireless telephone.

18. The wireless telephone of claim 16, wherein sending account information for the prepaid roaming services from the wireless telephone includes sending prepaid wireless air time from a prepaid calling card via the wireless telephone.

19. The wireless telephone of claim 16, wherein sending account information for the prepaid roaming services from the wireless telephone includes sending prepaid account balance from a prepaid calling card via the wireless telephone.

20. The wireless telephone of claim 16, wherein the method further comprises receiving prepaid roaming services options.

21. The wireless telephone of claim 16, wherein the method further comprises receiving instructions for inputting the account information for the prepaid roaming services into the wireless telephone.

22. The wireless telephone of claim 17, wherein the method further comprises receiving a call via the pseudo-telephone number.

23. The wireless telephone of claim 17, wherein the method further comprises placing a call via the pseudo-telephone number.

* * * * *